United States Patent [19]

Schlunke et al.

[11] Patent Number: 4,719,880
[45] Date of Patent: Jan. 19, 1988

[54] TWO STROKE CYCLE INTERNAL COMBUSTION ENGINES

[75] Inventors: Christopher K. Schlunke, Kingsley; Robert M. Davis, Mount Lawley, both of Australia

[73] Assignee: Orbital Engine Company Pty. Ltd., Balcatta, Australia

[21] Appl. No.: 866,427

[22] Filed: May 23, 1986

[30] Foreign Application Priority Data

May 24, 1985 [AU] Australia .............................. PH0732

[51] Int. Cl.⁴ ............................................ F02B 75/02
[52] U.S. Cl. ............................ 123/65 WA; 123/73 R; 123/657; 123/664; 123/193 H
[58] Field of Search ......... 123/73 R, 193 H, 193 CH, 123/294, 65 W, 65 WA, 73 A, 657, 664

[56] References Cited

U.S. PATENT DOCUMENTS

| | | | |
|---|---|---|---|
| 2,121,409 | 6/1938 | Ricardo | 123/65 W |
| 2,154,975 | 4/1939 | Dufour | 123/73 A |
| 3,572,298 | 3/1971 | Onishi et al. | 123/65 W |
| 3,817,227 | 6/1974 | Onishi | 123/73 A |
| 4,367,707 | 1/1983 | Suzuki | 123/193 H |
| 4,414,928 | 11/1983 | Nakada | 123/73 R |
| 4,549,508 | 10/1985 | Fujimoto | 123/193 H |

FOREIGN PATENT DOCUMENTS

| | | | |
|---|---|---|---|
| 535488 | 2/1955 | France | 123/65 WA |
| 0053110 | 4/1977 | Japan | 123/73 C |
| 0063529 | 5/1977 | Japan | 123/73 C |
| 0061606 | 5/1977 | Japan | 125/73 C |

Primary Examiner—Craig R. Feinberg
Assistant Examiner—David A. Okonsky
Attorney, Agent, or Firm—Murray and Whisenhunt

[57] ABSTRACT

A direct injected two stroke cycle internal combustion engine having a cylinder, a cylinder head at one end of the cylinder, a piston mounted for reciprocation in the cylinder, and an inlet port and an exhaust port in the wall of the cylinder at substantially diametrically opposite locations in the cylinder. A cavity in the cylinder head extending in a generally diametral direction from adjacent the cylinder wall at a location opposite the exhaust port. The cavity having substantially straight side edges in the direction of extension, and the longitudinal length of the cavity in said direction being about 0.55 to 0.77 of the diameter of the cylinder.

25 Claims, 5 Drawing Figures

TWO STROKE CYCLE INTERNAL COMBUSTION ENGINES

This invention relates to the combustion process in a two stroke cycle internal combustion engine and in particular relates to the fuel/air preparation within the engine.

In the control of contaminants in the exhaust from an internal combustion engine it is desirable to obtain effective distribution of the fuel in the dilutent charge within the cylinder, the dilutent charge being made up of air or, a mixture of air and retained exhaust gas. However in this preparation of the combustible charge by the indroduction of fuel to the dilutent charge it is desirable to prevent the fuel being distributed to parts of the combustion chamber distant from the point of ignition so as to create local fuel/air/exhaust gas mixture ratios which are too lean. Combustible lean mixtures promote the production of NOx as combustion is taking place in an oxident rich mixture, and non-combustible lean mixtures lead to the emission of hydrocarbons in the form of unburnt fuel in the exhaust gas.

It has previously been proposed to endeavour to control the distribution of fuel in a premixed charge engine by controlling the movement of the charge within the combustion chamber so that a degree of stratification of the fuel is obtained. This control of the premixed charge is difficult to obtain in a two stroke cycle engine as the gas movements in the combustion chamber are complex, and may experience many changes within that part of the engine cycle during which the air and fuel mixture is entering the combustion chamber at the same time as the exhaust gas is leaving the chamber.

In U.S. Pat. No. 3,817,227 by Onishi there is proposed to control the degree of, and generally prevent, mixing of the incoming premixed fuel/air charge with the exhaust gas in the cylinder in order to avoid dilution of the fuel/air mixture and resultant leaning out thereof. It is also proposed to impart a circular motion to the incoming premixed charge so that some fuel in that mixture will tend to migrate radially towards the periphery of the rotating charge due to centrifugal forces. However this disclosure appears to indicate that the fuel will only migrate in the direction towards the cylinder head, and ignores the fact that if centrifugal migration does occur it will occur in all radial directions. Accordingly it is difficult to believe as suggested in the patent specification that the circular motion will establish a fuel rich mixture only in the region of the point of ignition in the cylinder.

It is believed that, in view of the complex nature of the gas flow in the combustion chamber of a two stroke cycle engine during charging and exhaust, a sufficiently stable rotational motion could not be established to effect centrifugal migration of the fuel as proposed by Onishi. Further, if such fuel migration did occur it would result in fuel enrichment over the complete periphery of the rotating charge, and so fuel rich portions of the charge would be located both close to and remote from the ignition point. This would lead to a reduction in fuel efficiency, and could result in an increase in unburnt fuel with increased hydrocarbon in the exhaust gas.

It is therefore the object of the present invention to provide a two stroke cycle internal combustion engine construction that improves the preparation of the fuel and air mixture and controls the distribution thereof in the engine cylinder so as to enhance the control of emissions in the exhaust gas.

With this object in view there is, in accordance with one aspect of the present invention, provided a two stroke cycle internal combustion engine having a cylinder, a cylinder head at one end of the cylinder, a piston mounted for reciprocation in the cylinder, and an inlet port and an exhaust port in the wall of the cylinder at substantially diametrically opposite locations in the cylinder, said ports being opened and closed in timed relation by the reciprocating piston, a cavity in the cylinder head extending in a generally diametrical direction from adjacent the cylinder wall at a location opposite the exhaust port, the cavity having substantially straight side edges in the direction of extension and the length of the cavity in said direction being about 0.55 to 0.77 of the diameter of the cylinder, preferably about 0.55 to 0.68.

Preferably the bottom of the cavity is a continuous smooth surface with the cavity having a maximum depth of about 0.25 to 0.55 of the diameter of the cylinder, preferably more than 0.35 and preferably less than 0.45. Conveniently the ratio of length of the cavity in the direction of extension thereof to the maximum depth of the cavity is in the range of about 1 to 3, preferably above 1.5 and preferably below 2.5.

In determining the depth of the cavity the measurement is made from the diametral plane of the cylinder where the head abuts the end of the cylinder. In this regard it is to be understood that the cylinder head does not necessarily directly abut the cylinder but a conventional gasket may be located therebetween. Also it is to be understood that the face of the cylinder head in which the cavity is provided may be of a generally shallow concave shape as viewed from the cylinder. The concave face extends substantially to the diameter of the cylinder at the plane where the cylinder head joins the cylinder. The concave face is preferably part spherical, conveniently with a centre located on the axis of the cylinder when the head is assembled to the cylinder. The radius of the part spherical concave face may be of the order of 1.5 to 1.8 times the diameter of the cylinder.

In a preferred form the cavity has a bottom surface extending between the side walls of the cavity, that is in a generally continuous curve in the direction of extent of the cavity with the deeper part substantially arcuate blending smoothly with near straight parts at each end that extend to the face of the cylinder head. The bottom surface at the exhaust part end of the cavity is steeply inclined to the face of the cylinder head and is preferably substantially normal to the diametral plane of the cylinder where it meets the cylinder head face. The other near straight part of the cavity bottom surface is less steeply inclined, the inclination resulting in that other end of the bottom surface meeting the face of the cylinder head adjacent the upper end of the wall of the cylinder. The deeper arcuate part of the cavity may be of a radius of about 0.3 of the diameter of the cylinder and preferably is in the range of 0.2 to 0.35. The radius of the arcuate part is preferably less than the depth of the cavity at the deepest point. The shape of the bottom of the cavity, and particularly the substantially arcuate portion at the end opposite to the inlet port of the cylinder, promotes the establishment of a rotating or swirling motion of the charge about an axis transverse to the longitudinal direction of the cavity. Considered in more detail the air entering the cylinder is directed upwardly into the cavity at the end adjacent the cylinder wall. The shape of the base of the cavity smoothly directs this air flow into the arcuate part of the cavity base where the air flow is turned back into the cylinder. However the air flow tends to continue in the circular path developed by the movement along the arcuate part of the cavity base, and so air flows back across the cylinder to re-enter the cavity at the other end.

Initially the air flow is in a circular path of relative large diameter, and low speed, however as the piston moves upwardly in the cylinder after part closure the diameter is reduced and the speed increased.

Fuel is injected into the cylinder in a generally diametral direction through the rotating air charge, and a spark plug is located in the path of the air flow downstream from the injection location and within the cavity. This relation provides a fuel rich mixture at the spark plug for initiation of combustion and the rotary motion of the air feeds fuel from the injection point to the spark plug to maintain combustion. In addition the rotary motion of the air will carry fuel from the engine cylinder back into the cavity to the area of combustion.

It is also to be noted that the direction of rotation of the air in the cylinder promotes the movement of the air and the fuel away from the exhaust port toward the opposite side of the cylinder. This reduces the dilution of the fuel/air mixture by exhaust gases and so maintains a richer more combustible mixture. It also reduces the loss of fuel through the exhaust port.

Conveniently side walls of the cavity, extending from said parallel side edges are generally at right angles to the diametral plane of the cylinder, or at least steeply inclined thereto, to promote retention and restrict lateral spilling of the charge therefrom. Preferably the surface of the cylinder head adjoining the cavity is slightly inclined to the axis of the cylinder as provided by a concave face on the cylinder head as previously discussed. This configuration of the under surface of the cylinder head establishes a gas flow towards the cavity as the piston rises in the cylinder, to contribute to the maintenance and/or promote the swirling movement of the charge in the cavity and to assist in retention of the charge in the cavity or at least in the area of the cylinder remote from the exhaust port.

The width of the cavity between the side walls is preferably about 0.5 of the cylinder diameter and may vary in the range of about 0.35 to 0.65 of the cylinder diameter.

The cavity in the cylinder head is preferably located substantially symmetric with respect to the axial plane of the cylinder through the centre of the opposed inlet and exhaust ports. The cavity extends in the direction across the cylinder from substantially the cylinder wall immediately above the inlet port, to a distance past the cylinder centre.

Conveniently the fuel is injected into the cavity on a trajectory to intersect the direction of the swirling charge. The fuel is preferably injected at approximately the centre of the arcuate base of the cavity, the spark plug being positioned in the cavity to be in the path of the swirling charge downstream of the point of injection of the fuel.

In addition to the inlet port opposite the exhaust port, further inlet ports may be provided, on either side thereof. The additional inlet ports being arranged so that the charge entering the cylinder therethrough is directed towards the charge entering via the central inlet port, as well as being directed upward towards the cavity in the cylinder head.

It has been found that by locating the major part of the cavity in the cylinder head on the side of the cylinder opposite to that in which the exhaust port is located assists in limiting the migration of the fresh charge into the exhaust gas being expelled from or retained in the combustion chamber. Also the steepness of the bottom surface of the cavity at the inner end thereof and the upward movement of the charge ahead of the piston after exhaust and inlet port closure promotes retention of the fresh charge in the cylinder head cavity.

The retention of the fresh charge in the cavity, with the fuel being injected into the cavity, provides a highly ignitable charge due principally to the high oxidant content of the charge. It has been found that if the cavity extends across the cylinder beyond the limits previously specified the exhaust gas content of the charge in the cavity increases to a level to adversely affect the ignitability of the charge particularly at light load and/or low speed operation of the engine.

The limits specified in the width of the cavity are of particular significance in controlling detonation. As the width of the cavity increases the flame path length from the cavity edge to the cylinder wall decreases, with a resultant increase in the possibility of detonation of the charge trapped between the piston and the cylinder head surrounding the cavity.

The depth of the cavity is important in achieving stratification of the fuel in the air charge, the greater the depth of the cavity the greater the extent of fuel stratification in the air. The depth of the cavity also increases the flame path through the mixture in the cavity and thus reduces the risk of detonation particularly at high load. The fuel is preferably injected into the cavity at the deepest part thereof and preferably in a direction across the cavity toward the piston. The degree of penetration of the fuel cloud should be such that the fuel is dispersed in a stratified manner within the air charge in the cavity and does not extend to the piston.

The invention will be further described with reference to one practical arrangement of an internal combustion engine incorporating the present invention as illustrated in the accompanying drawings.

Figure 1:
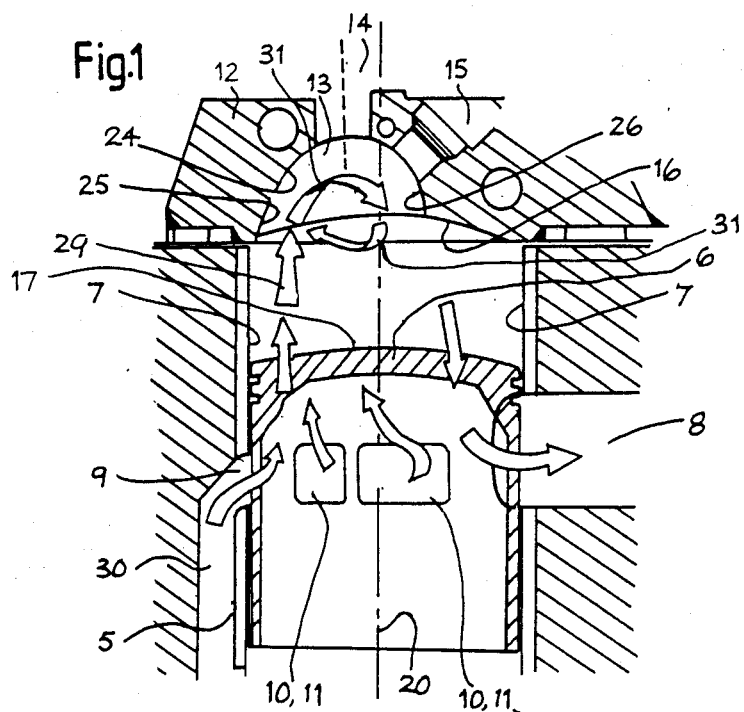
FIG. 1 is an axial cross-section of the engine and cylinder head.

Referring now to the drawings, in FIG. 1, cylinder 5 has a piston 6 disposed therein to reciprocate in the axial direction of the cylinder and coupled to a crank shaft not shown in the drawing. The circumferential wall 7 of the cylinder has an exhaust port 8 and a diametrically opposite inlet or transfer port 9 divided into two parts. a pair of additional transfer port 10 and 11 are disposed generally symmetrically on either side of the transfer port 9.

The upper end of the cylinder 5 is closed by a detachable cylinder head 12 having a cavity 13 formed therein in an eccentric disposition with respect to the cylinder axis 20. An opening 14 is provided in the top of the cavity to receive a fuel injection nozzle, and an aperture 15 is provided at the inner end of the cavity for the receipt of a conventional spark plug. The head 17 of the piston 6 is slightly domed, and the opposing underface 16 of the cylinder head 12 is of a complimentary concave shape except for the provision of the cavity 13 therein.

The cavity 13 is located substantially symmetrical with respect to the axial plane 19 of the cylinder (FIG. 2) extending through the centre of the transfer port 9 and exhaust port 8. The cavity 13 extends across the cylinder from the cylinder wall immediately above the transfer port 9, to a distance past the cylinder centre line.

Figure 4:
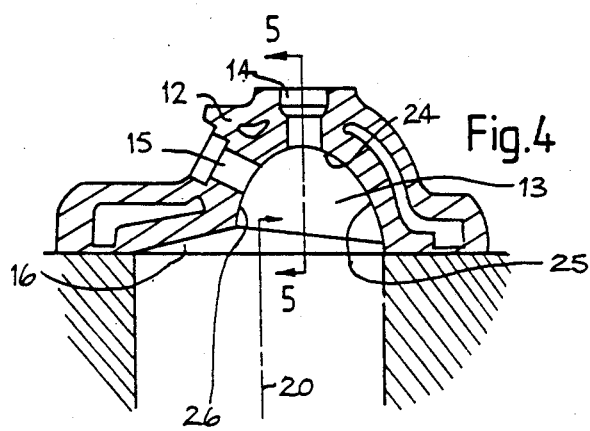
FIG. 4 is a diametral sectional view along line 4—4 in FIG. 3.
Figure 5:
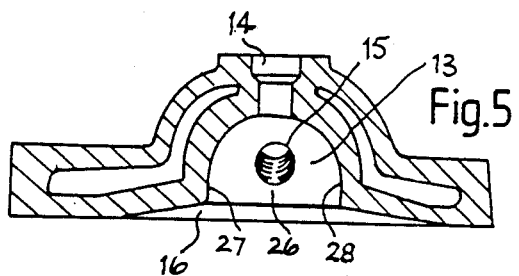
FIG. 5 is a cross sectional view along line 5—5 in FIG. 4.

As previously described the cross sectional shape of the cavity 13 along the axial plane 19 of the cylinder as shown in FIG. 4 is substantially arcuate at the base 24, with the centre line 21 of the arc somewhat closer to the centre line of the cylinder than the cylinder wall above the transfer port 9. The end of the arcuate base 24 closer to the cylinder wall, above the transfer port 9, merges with a generally straight face 25 extending to the underface 16 of the cylinder head 12 at the cylinder wall 7. The face 25 is inclined upwardly from the cylinder wall 7 to the arcuate base 24 of the cavity.

The opposite or inner end of the arcuate base 24 merges with a relatively short generally vertical face 26 that extends to the underface 16 of the cylinder head. The face 26 is generally parallel to the cylinder axis so that it meets the underface 12a at a relatively steep angle. The opposite side walls 27 and 28 of the cavity are generally flat and parallel to the axial plane 19 of the cylinder, and so also meet the underface 16 of the cylinder head at a steep angle.

Figure 2:
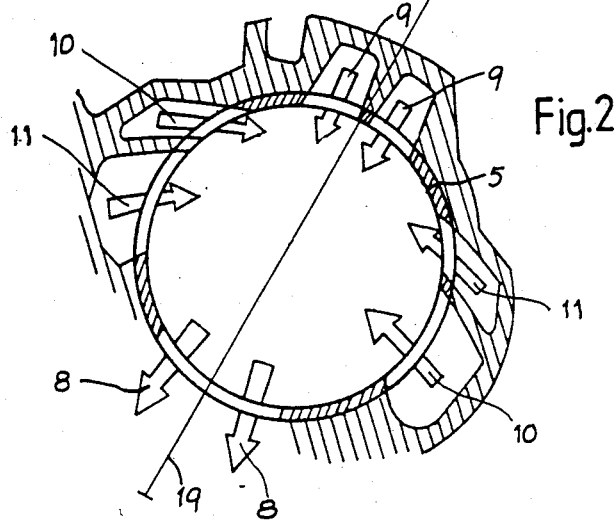
FIG. 2 is a diametral cross-section of one cylinder at the level of the transfer and exhaust ports.
Figure 3:
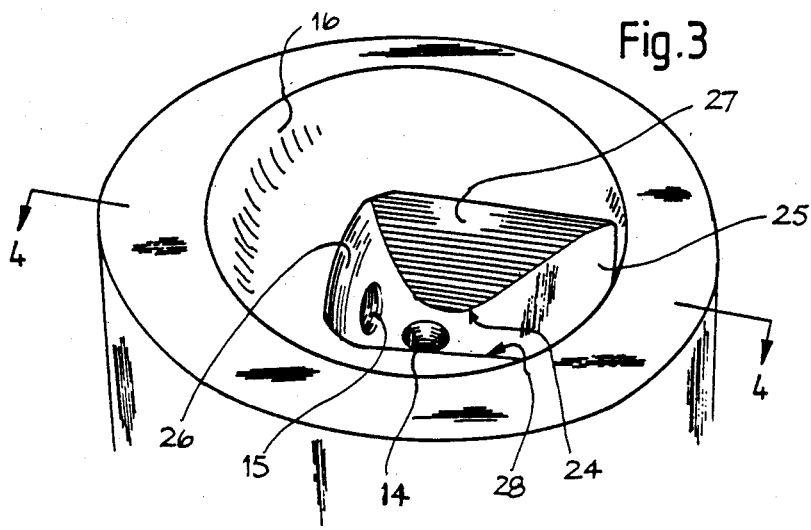
FIG. 3 is an underneath perspective view of the cylinder head.

As can be seen in FIG. 1 the configuration of the passage 30 leading to the transfer port 9 is upwardly inclined towards the cylinder head 12 so that the charge entering the cylinder through the transfer port 9 will be similarly upwardly directed into the cavity 13. The transfer ports 10 and 11 are similarly shaped to direct the charge upwardly towards the cavity 13 and as seen in FIG. 2, are inclined towards the central transfer port 9 so as to direct the flow of the charge through the ports 10 and 11 inwardly towards the cavity 13.

As indicated by the arrow 29 in FIG. 1 the general direction of the incoming charge of air is upwardly into the cavity 13, to enter at the area adjacent the cylinder wall 7. The flow of the charge is then formed into a rotating or swirling motion by the arcuate shape of the base of the cavity as indicated by arrow 31. The upward movement of the incoming charge on the left hand side of the cylinder, as seen in FIG. 1, displaces the exhaust gases from the previous cycle towards the right hand side of the cylinder and hence towards the exhaust port 8. In addition the circular motion of the incoming charge entering the cavity 13 scavenges the exhaust gases from the cavity and promotes the flow thereof towards the exhaust port 8.

The initial flow of charge through the transfer ports into the cylinder, whilst the piston is displaced a considerable distance down the cylinder, will create an initial rotary or swirling motion of the charge in the cavity 13 and the adjacent area of the cylinder. As the piston moves up the cylinder the air in the cylinder will be displaced towards the cavity to be entrained in the swirling charge. It will also contract the charge into a smaller volume and so increase the speed of rotation of the charge in the cavity.

The scavenging action in the cavity 13 of the incoming charge results in a low exhaust gas content in the rotary charge cloud in the cavity 13, and thus the cloud has a maximum oxident content. The fuel injected into the cavity 13 is entrained in the rotating air charge and carried toward the spark plug.

The steep inclination of the face 26 of the inner end wall and opposite side walls 27 and 28 of the cavity 13 assists in retaining the rotating charge cloud in the cavity. Also as the piston rises in the cylinder the charge trapped between the piston crown and cylinder head moves toward and into the cavity 13 over these steep walls. This charge movement contributes to the maintenance of an oxident rich cloud in the cavity to support combustion of the fuel therein.

In one specific embodiment of a two stroke cycle engine incorporating the present invention the bore of the cylinder is 84 mm with the cavity having a length in the direction through the centre of the cylinder of 55 mm and a width of 42 mm. The centre line 21 of the arcuate base 24 is offset from the centreline of the cylinder by 11 mm and from the plane of the low face of the head 12 by 10 mm. The radius of the arcuate base is 23mm.

A fuel metering and injection method and device suitable for metering and delivering fuel to an engine operating as disclosed herein are described in detail in Australian Patent Application No. 32132/84 lodged 3rd Aug. 1984, inventor Michael Lacnard McKay the disclosure of which is hereby incorporated by reference for the teaching of fuel metering and injection method and device therein.

An alternative fuel metering and injection method and device is described in International Patent Application No. PCT/AU85/00176, lodged in Australia, inventor Michael Leonard McKay, the disclosure of which is incorporated by reference for the teaching of the fuel metering and injection method and device therein.

A particularly advantageous method and apparatus for controlling contaminants in a two stroke cycle engine, that may be used in conjunction with the present invention, is disclosed in the Patent Application lodged the same day as this application and entitled Improvements Relating to Controlling Emissions from Two Stroke Engines, inventor, C. K. Schlunka, the disclosure of which is hereby incorporated by reference.

The operation and construction of an internal combustion engine as herein disclosed may be used in many forms of two stroke cycle engine including for or incorporated in vehicles for use on land, sea or in the air including engines in or for motor vehicles, boats or aeroplanes. In particular the engines as herein described may be installed in a boat, vehicle or aeroplane to propel same, and includes outboard marine engines.

We claim:

1. A two stroke cycle internal combustion engine having a cylinder, a cylinder head at one end of the cylinder, a piston mounted for reciprocation in the cylinder, and an inlet port and an exhaust port in the wall of the cylinder at substantially diametrically opposite locations in the cylinder, said ports being opened and closed in timed relation by the reciprocating piston, a cavity in the cylinder head extending in a generally diametral direction from adjacent the cylinder wall at a location directly above the inlet port, wherein the cylinder head and cylinder wall juncture form a transition zone for substantially smooth air flow from the inlet port to said cavity, an injector nozzle opening in an upper portion of the cavity from which fuel may be injected into the cylinder, the cavity having substantially parallel straight side edges in the direction of extension spaced apart a distance of about 0.35 to 0.65 of the diameter of the cylinder, and the longitudinal length of the cavity in said direction of extension being about 0.55 to 0.77 of the diameter of the cylinder.

2. A two stroke cycle internal combustion engine as claimed in claim 1 wherein the cavity progressively increases in depth from the end thereof adjacent the cylindere wall to a location of maximum depth spaced from said cylinder wall a distance between about 0.25 and not more than 0.5 of the cylinder diameter, said maximum depth being about 0.25 to 0.55 of the diameter of the cylinder, when measured from the diametral plane of that face of the cylinder head directed towards the piston.

3. A two stroke cycle internal combustion engine as claimed in claim 2 wherein the injection nozzle opening is in the location of maximum depth of the cavity.

4. A two stroke cycle internal combustion engine as claimed in claim 1 wherein the cavity has substantially parallel opposite sides extending from said substantially straight side edges and a base extending between said side walls, said base extending from the end of the cavity adjacent the cylinder wall as a generally continuous curve to progressively increase the depth of the cavity to a location of maximum cavity depth whereafter the base curves to progressively reduce the depth of the cavity to the other end of the cavity, the location of maximum depth being spaced longitudinally from said end of the cavity adjacent the cylinder wall more than half the length of the cavity.

5. A two stroke cycle internal combustion engine as claimed in claim 4 wherein an igniter device opening is provided in the base of the cavity spaced from the injector nozzle opening in the direction toward the end of the cavity opposite to said end adjacent the cylinder wall.

6. A two stroke cycle internal combustion engine as claimed in claim 1 wherein the depth of the cavity progressively increases in depth from the one end adjacent the cylinder wall to a location of maximum depth and thereafter progressively decreases in depth to the other end of the cavity, whereby the base of the cavity presents a generally concave surface to the piston that will induce gas entering the cavity at the one end to establish a rotational motion about an axis transverse to the longitudinal direction of the cavity as the gas passes through the cavity, whereby the gas upon leaving the cavity is induced to move towards said one end of the cavity.

7. A two stroke cycle internal combustion engine as claimed in claims 1 or 3 wherein the cavity has substantially parallel opposite side walls extending from said substantially straight side edges.

8. A two stroke cycle internal combustion engine as claimed in claim 2 or 3 wherein the cavity, in the location of maximum depth, is of generally arcuate shape in cross section in the direction of length of the cavity, said arcuate shape being of a radius of about 0.2 to 0.35 of the diameter of the cylinder.

9. A two stroke cycle fuel injected internal combustion engine as claimed in any one of claims 2 or 3 wherein said engine is used to propel an automobile.

10. A two stroke cycle fuel injected internal combustion engine as claimed in any one of claims 2 or 3 wherein said engine is used to propel an aeroplane.

11. A two stroke cycle internal combustion engine as claimed in claim 2 or 3 wherein an igniter device opening is provided in the base of the cavity and spaced from the injector nozzle opening in the direction toward the end of the cavity opposite to said end adjacent the cylinder wall.

12. A two stroke cycle internal combustion engine as claimed in claim 11 wherein the injection nozzle opening is in the location of maximum depth of the cavity.

13. A two stroke cycle fuel injected internal combustion engine as claimed in any one of claims 2 or 3 wherein said engine is used to propel a boat.

14. A two stroke cycle fuel injected internal combustion engine as claimed in claim 13 wherein said engine is an outboard marine engine.

15. A two stroke cycle internal combustion engine as claimed in claims 4 or 9 wherein the ratio of cavity length in the longitudinal direction to the cavity maximum depth is in the range from 1 to 3.

16. A two stroke cycle internal combustion engine as claimed in claim 15 wherein the maximum depth of the cavity is about 0.35 to 0.45 of the cylinder diameter.

17. A two stroke cycle internal combustion engine as claimed in claim 15 wherein the longitudinal length of the cavity is about 0.55 to 0.68 of the cylinder diameter.

18. A two stroke cycle combustion engine as claimed in any one of claims 1, 2 or 3, wherein the substantially straight parallel side edges of the cavity are spaced apart a distance of about 0.35 to 0.45 of the diameter of the cylinder.

19. In a vehicle propelled by an internal combustion engine, said vehicle including a vehicle body, wheels supporting said body for travel on the ground and a liquid fuel injected two stroke cycle internal combustion engine mounted in the body to propel the vehicle, said engine having a cylinder, a cylinder head at one end of the cylinder, a piston mounted for reciprocation in the cylinder, and an inlet port and an exhaust port in the wall of the cylinder at substantially diametrically opposite locations in the cylinder, said ports being opened and closed in timed relation by the reciprocating piston, a cavity in the cylinder head extending in a generally diametral direction from adjacent the cylinder wall at a location directly above the inlet port, wherein the cylinder head and cylinder wall juncture form a transition zone for substantially smooth air flow from the inlet port to said cavity, an injector nozzle opening in an upper portion of the cavity from which fuel may be injected into the cylinder, the cavity having substantially parallel straight side edges in the direction of extension spaced apart a distance of about 0.35 to 0.65 of the diameter of the cylinder and the longitudinal length of the cavity in said direction of extension being about 0.55 to 0.77 of the diameter of the cylinder.

20. An internal combustion engine for propelling a vehicle, said engine being a fuel injected two stroke cycle engine comprising a cylinder, a cylinder head at one end of the cylinder, a piston mounted for reciprocation in the cylinder, and an inlet port and an exhaust port in the wall of the cylinder at substantially diametrically opposite locations in the cylinder, said ports being opened and closed in timed relation by the reciprocating piston, a cavity in the cylinder head extending in a generally diametral direction from adjacent the cylinder wall at a location directly above the inlet port, wherein the cylinder head and cylinder wall juncture form a transition zone for substantially smooth air flow from the inlet port to said cavity, an injector nozzle opening in an upper portion of the cavity from which fuel may be injected into the cylinder, the cavity having substantially parallel straight side edges in the direction of extension spaced apart a distance of about 0.35 to 0.65 of the diameter of the cylinder, and the longitudinal length of the cavity in said direction of extension being about 0.55 to 0.77 of the diameter of the cylinder.

21. In a boat to be propelled by an internal combustion engine including a boat hull and a fuel injected two stroke cycle internal combustion engine fitted to said hull to propel same, said engine comprising a cylinder, a cylinder head at one end of the cylinder, a piston mounted for reciprocation in the cylinder, and an inlet port and an exhaust port in the wall of the cylinder at substantially diametrically opposite locations in the cylinder, said ports being opened and closed in timed relation by the reciprocating piston, a cavity in the cylinder head extending in a generally diametral direction from adjacent the cylinder wall at a location directly above the inlet port, wherein the cylinder head and cylinder wall juncture form a transition zone for substantially smooth air flow from the inlet port to said cavity, an injector nozzle opening in an upper portion of the cavity from which fuel may be injected into the cylinder, the cavity having substantially parallel straight side edges in the direction of extension spaced apart a distance of about 0.35 to 0.65 of the diameter of the cylinder, and the longitudinal length of the cavity in said direction of extension being about 0.55 to 0.77 of the diameter of the cylinder.

22. In a boat as claimed in claim 21, the engine being an outboard marine engine.

23. An internal combustion engine for propelling a boat, said engine being a fuel injected two stroke cycle engine comprising a cylinder, a cylinder head at one end of the cylinder, a piston mounted for reciprocation in the cylinder, and an inlet port and an exhaust port in the wall of the cylinder at substantially diametrically opposite locations in the cylinder, said ports being opened and closed in timed relation by the reciprocating piston, a cavity in the cylinder head extending in a generally diametral direction from adjacent the cylinder wall at a location directly above the inlet port, wherein the cylinder head and cylinder wall juncture form a transition zone for substantially smooth air flow from the inlet port to said cavity, an injector nozzle opening in an upper portion of the cavity from which fuel may be injected into the cylinder, the cavity having substantially parallel straight side edges in the direction of extension spaced apart a distance of about 0.35 to 0.65 of the diameter of the cylinder, and the longitudinal length of the cavity in said direction of extension being about 0.55 to 0.77 of the diameter of the cylinder.

24. An internal combustion engine as claimed in claim 23 being an outboard marine engine.

25. A two stroke cycle internal combustion engine comprising a cylinder having a wall, a cylinder head at one end of the cylinder, a piston mounted for reciprocal movement in the cylinder, an inlet port and an exhaust port located in the wall of the cylinder at substantially diametrically opposite locations in the cylinder, said ports being opened and closed in timed relation by the reciprocating piston, a cavity in the cylinder head extending from substantially the cylinder wall immediately above the inlet port across the cylinder to a location past the cylinder center, with the longitudinal length of the cavity in the direction of extension being about 0.55 to 0.77 of the cylinder diameter, the cavity having substantially parallel straight side edges in the direction of extension, and an injector nozzle means opening in an upper portion of the cavity for injecting fuel into the cylinder, said inlet port including inlet means for directing an air charge passing through said inlet port upwards towards said cavity, and for cooperating with said cavity to establish a rotating motion of the air charge about an axis transverse to the longitudinal direction of the cavity and to promote movement in the cylinder of the air charge and fuel away from the exhaust port toward the opposite side of the cylinder to limit migration of fresh charge into exhaust gas being expelled from the cylinder.

* * * * *